United States Patent
Thoreson et al.

(10) Patent No.: US 10,517,221 B2
(45) Date of Patent: Dec. 31, 2019

(54) ROUND BALER WITH DUAL WRAPPING ROLLS

(71) Applicant: Vermeer Manufacturing Company, Pella, IA (US)

(72) Inventors: Kent P. Thoreson, Bussey, IA (US); Justin D. Olmstead, Runnells, IA (US)

(73) Assignee: Vermeer Manufacturing Company, Pella, IA (US)

( * ) Notice: Subject to any disclaimer, the term of this patent is extended or adjusted under 35 U.S.C. 154(b) by 764 days.

(21) Appl. No.: 14/910,609

(22) PCT Filed: Sep. 9, 2014

(86) PCT No.: PCT/US2014/054738
§ 371 (c)(1),
(2) Date: Feb. 5, 2016

(87) PCT Pub. No.: WO2015/035368
PCT Pub. Date: Mar. 12, 2015

(65) Prior Publication Data
US 2016/0183474 A1    Jun. 30, 2016

Related U.S. Application Data

(60) Provisional application No. 61/888,769, filed on Oct. 9, 2013, provisional application No. 61/875,472, filed on Sep. 9, 2013.

(51) Int. Cl.
*A01F 15/07*   (2006.01)
*B65B 11/58*   (2006.01)
*B65B 57/04*   (2006.01)

(52) U.S. Cl.
CPC .......... *A01F 15/0715* (2013.01); *B65B 11/58* (2013.01); *B65B 57/04* (2013.01);
(Continued)

(58) Field of Classification Search
CPC ............ A01F 15/0715; A01F 2015/072; A01F 2015/076; A01F 2015/077;
(Continued)

(56) References Cited

U.S. PATENT DOCUMENTS 4,656,931 A * 4/1987 Van Den Bossche ....................... A01F 15/141 100/4
4,703,605 A * 11/1987 Ackermann ............ A01F 15/07 53/118

(Continued)

FOREIGN PATENT DOCUMENTS

EP    2 596 697 A1    5/2013

*Primary Examiner* — Andrew M Tecco
*Assistant Examiner* — Nicholas E Igbokwe
(74) *Attorney, Agent, or Firm* — Armstrong Teasdale LLP

(57) ABSTRACT

The present disclosure relates to a round baler (10) including a baling chamber (12) for forming a bale (26) and a first wrapping mechanism (32) mounted to the baling chamber (12). The first wrapping mechanism (32) includes a feed system that feeds the wrap material (30*a*) into the baling chamber (12). The round baler (10) further comprises a second wrapping mechanism (34) mounted to the baling chamber (12) which includes a feed system that feeds the wrap material (30*b*) into the baling chamber (12). Further, the round baler (10) includes an inlet (40) wherein wrap material (30*a*) from the first wrapping mechanism (32) and wrap material (30*b*) from the second wrapping mechanism (34) enter the baling chamber (12). The first wrapping mechanism (32) and second wrapping mechanism (34) are configured to be operated independently.

16 Claims, 15 Drawing Sheets

(52) U.S. Cl.
CPC ... *A01F 2015/072* (2013.01); *A01F 2015/076* (2013.01); *A01F 2015/077* (2013.01)

(58) Field of Classification Search
CPC .. A01F 2015/078; A01F 15/071; B65B 11/58; B65B 11/04; B65B 57/04; B65B 57/02
USPC ............... 53/389.2–389.5, 64, 118, 168, 587
See application file for complete search history.

(56) References Cited

U.S. PATENT DOCUMENTS

| | | | |
|---|---|---|---|
| 5,129,208 A | 7/1992 | Van Zee | |
| 5,433,059 A * | 7/1995 | Kluver | A01F 15/0715 53/118 |
| 5,503,349 A | 4/1996 | Chertok | |
| 5,729,953 A * | 3/1998 | Fell | A01F 15/0715 53/118 |
| 5,974,764 A | 11/1999 | Anstey et al. | |
| 7,478,517 B2 * | 1/2009 | Paillet | A01F 15/0715 53/211 |
| 7,716,903 B2 | 5/2010 | McClure et al. | |
| 7,908,822 B2 | 3/2011 | McClure | |
| 8,490,366 B1 * | 7/2013 | Hintz | A01F 15/0715 242/422.4 |
| 2005/0109007 A1 * | 5/2005 | Hood | A01F 15/0715 56/341 |
| 2008/0022649 A1 * | 1/2008 | De Gersem | A01F 15/0715 56/341 |
| 2009/0282788 A1 * | 11/2009 | McClure | A01F 15/0715 53/587 |
| 2011/0155830 A1 * | 6/2011 | Murphy | A01D 87/127 241/101.73 |
| 2013/0125518 A1 * | 5/2013 | Smith | A01F 15/0715 53/582 |
| 2013/0255196 A1 * | 10/2013 | Johnston | A01F 15/071 53/465 |

* cited by examiner

ROUND BALER WITH DUAL WRAPPING ROLLS

CROSS-REFERENCE TO RELATED APPLICATIONS

This application is the National Phase of PCT International Application No. PCT/US2014/054738, filed on Sep. 9, 2014, which claims priority under 35 U.S.C. 119(e) to U.S. Provisional Application No. 61/875,472, filed on Sep. 9, 2013 and 61/888,769 filed on Oct. 9, 2013, all of which are hereby expressly incorporated by reference into the present application.

FIELD OF THE DISCLOSURE

The field of the disclosure relates generally to round balers used for harvest of agricultural crops.

BACKGROUND

Round balers have become an integral part of the agricultural industry and a variety of different types of balers are currently in use. Balers that use a system of belts that compress the bale and systems that used a fixed chamber to form the bale are commonly used. However, common to all balers is the need to wrap the finished round bale with a wrap material or a material that secures the bale. After the crop material has been picked up by the baler and a bale is completely formed in the chamber, the bale is then typically wrapped with a wrap material to keep the bale intact and protected. After the wrapping is completed, the bale is ejected from the baling chamber and is later picked up for storage or use.

To accomplish the wrapping of the round bale, mechanisms have been developed to feed wrap material from single rolls into the baling chamber. An example of this type of prior art is the wrapping mechanism disclosed in U.S. Pat. No. 5,129,208. This wrapping device feeds wrap material from a single roll into the baling chamber. In addition, mechanisms that draw from two rolls of wrap material have also been developed. An example of such prior art is the wrapping mechanism disclosed in U.S. Pat. No. 7,478,517. This wrapping device utilizes two rolls of wrap material, two cutting devices and a single feeding mechanism. It has the capability to feed just the first roll or both rolls at the same time. Feeding of the second roll is possible only when biasing the second roll against the first roll. Similarly, as shown in U.S. Pat. No. 7,716,903 a belt drive mechanism can be attached to two rolls of wrap material, where one roll is an active roll and the other roll is powered by the belt attached to the active roll. This device discloses starting the second passive roll as the active roll is ending so the wrapping process can continue even if one roll runs out of netwrap. However, because the passive roll is powered by the active roll, the passive roll can only be fed if the active roll is being fed. Another example is shown in U.S. Pat. No. 4,703,605, which uses two rolls of wrapping material and enters the baling chamber at two separate locations.

To maximize the life of each roll of wrap material it is important that each bale be wrapped with a precise amount of wrap. For example, in current systems a bale is sometimes either under wrapped, where the bale is ejected and begins to fall apart, or over wrapped, which is a waste of wrapping material.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to a round baler having a baling chamber for forming a bale. A first wrapping mechanism is mounted to the baling chamber. The wrapping mechanism includes a mounting assembly for removably mounting a roll of wrap material and for feeding the wrap material into the bale chamber. A first actuator is attached to the first wrapping mechanism and has three positions—a first position wherein the actuator moves the wrap material into a starting feed position, a second position wherein the wrap material is positioned in a feeding position and a third position wherein the actuator moves the wrap material into a cutting position wherein the wrap material contacts the cutting device. A second wrapping mechanism is mounted to the baling chamber. The wrapping mechanism includes a mounting assembly for removably mounting a roll of wrap material and for feeding the wrap material into the bale chamber. A second actuator is attached to the second wrapping mechanism and has three positions—a first position wherein the actuator moves the wrap material into a starting feed position, a second position wherein the wrap material is positioned in a feeding position and a third position wherein the actuator moves the wrap material into a cutting position wherein the wrap material contacts the cutting device. The round baler also includes an inlet wherein wrap material from the first wrapping mechanism and wrap material from the second wrapping mechanism enter the baling chamber.

Another aspect of the present disclosure is directed to a method of wrapping a round bale with a round baler. The round baler includes a controller, a baling chamber with a single wrap material inlet, a first wrapping mechanism for dispensing wrap material to the baling chamber at the wrap material inlet and a second wrapping mechanism for dispensing wrap material to the baling chamber at the wrap material inlet. The amount of wrap material dispensed from the first wrapping mechanism is measured by way of a first sensor. The first sensor is in communication with the controller and the first wrapping mechanism. The amount of wrap material dispensed from the second wrapping mechanism is measured by way of a second sensor. The second sensor is in fluid communication with the controller and the second wrapping mechanism. The total cumulative length of applied wrap material dispensed is calculated by adding the amount of wrap material dispensed from the first wrapping mechanism as measured by the first sensor to the amount of wrap material dispensed from the second wrapping mechanism as measured by the second sensor. The wrapping of the round bale is stopped when the total cumulative length of applied wrap material equals a predetermined value.

Yet another aspect of the present disclosure is directed to a method of wrapping a round bale with a round baler. The round baler includes a baling chamber and a first wrapping mechanism for dispensing wrap material to the baling chamber, the first wrapping mechanism including a roll of first wrap material, and a second wrapping mechanism for dispensing wrap material to the baling chamber, the second wrapping mechanism including a roll of second wrap material, the first wrapping material being different from the second wrapping material. The method comprises wrapping a bale with the first wrapping mechanism or the second wrapping mechanism. The wrapping mechanism is selected based on a characteristic of the bale.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

Corresponding reference characters indicate corresponding parts throughout the drawings.

DETAILED DESCRIPTION

Figure 1:
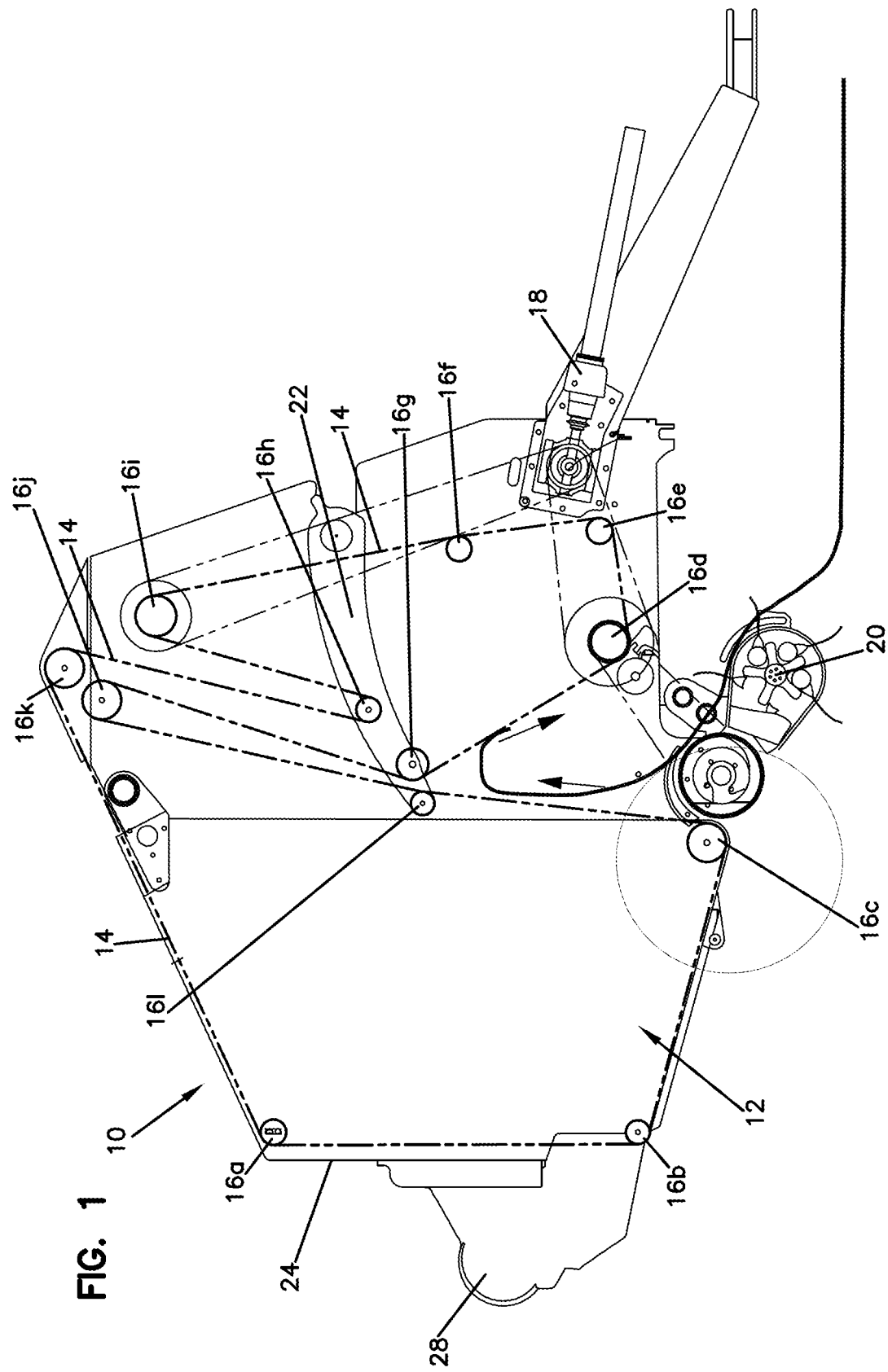
FIG. 1 is a schematic side view of an empty round baler.
Figure 2:
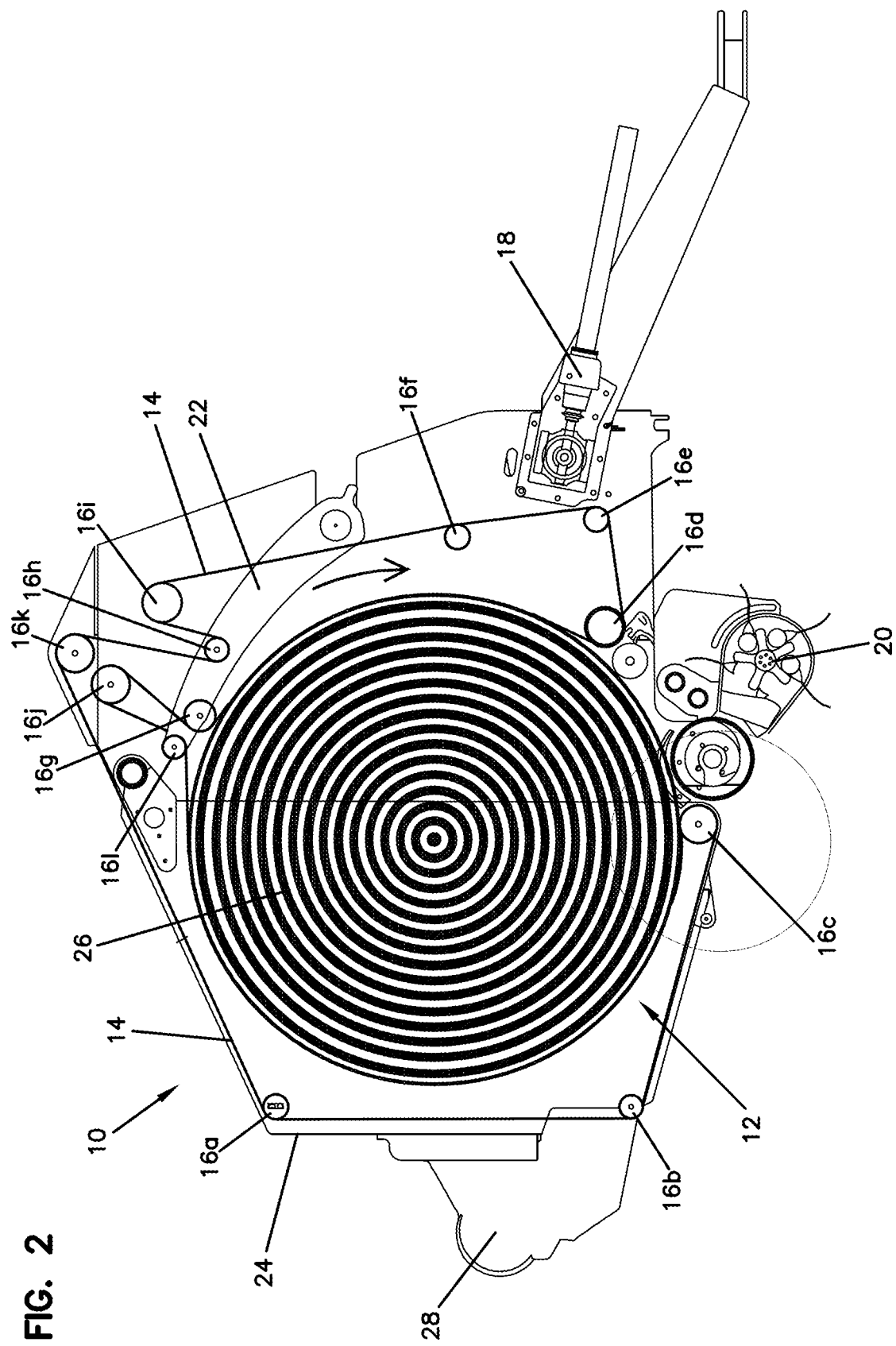
FIG. 2 is a schematic side view of a round baler with a full-sized bale therein.

FIGS. 1 and 2 show a schematic side view of a round baler 10. In accordance with the principles of the present disclosure in the example shown in FIG. 1, the round baler 10 uses an expandable baling chamber 12 which operates by utilizing a series of bale forming belts 14 routed around a series of rollers 16a-1. Alternatively, a single bale forming belt may be utilized. Additionally, the baler includes a driving means 18, a pick-up device 20, a single or a plurality of belt tighteners 22, and a lift gate 24. As material is picked up by the pick-up device 20, and deposited in the baling chamber 12, the material is compressed by the plurality of bale forming belts 14. Tension is maintained in the bale forming belts by the series of belt tighteners 22 to ensure a properly compressed bale. Once a full bale 26 is formed, as shown in FIG. 2, pickup is ceased and a wrapping sequence is commenced by a wrapping device 28. The wrapping device 28 is configured to apply a layer of wrap material, to the outer circumference of the completed bale 26. The wrap material can include a variety of materials suitable for retaining the shape of the bale, protecting the bale and for limiting exposure of the bale to moisture. Sheet-type netwrap, plastic or fabric sheets, or film-type sheets are just some examples that are commonly used in the industry as wrap material. In some embodiments of the present disclosure, the wrap material is not twine (e.g., may be sheet-type netwrap, plastic or fabric sheets, or film-type sheets).

Once the wrapping sequence is completed, the operator ejects the full bale 26 from the baling chamber 12 by opening the lift gate 24. Further details relating to the baling operation within the baling chamber 12 can be found in U.S. Pat. No. 7,181,900, which is hereby incorporated by reference for all relevant and consistent purposes.

Figure 3:
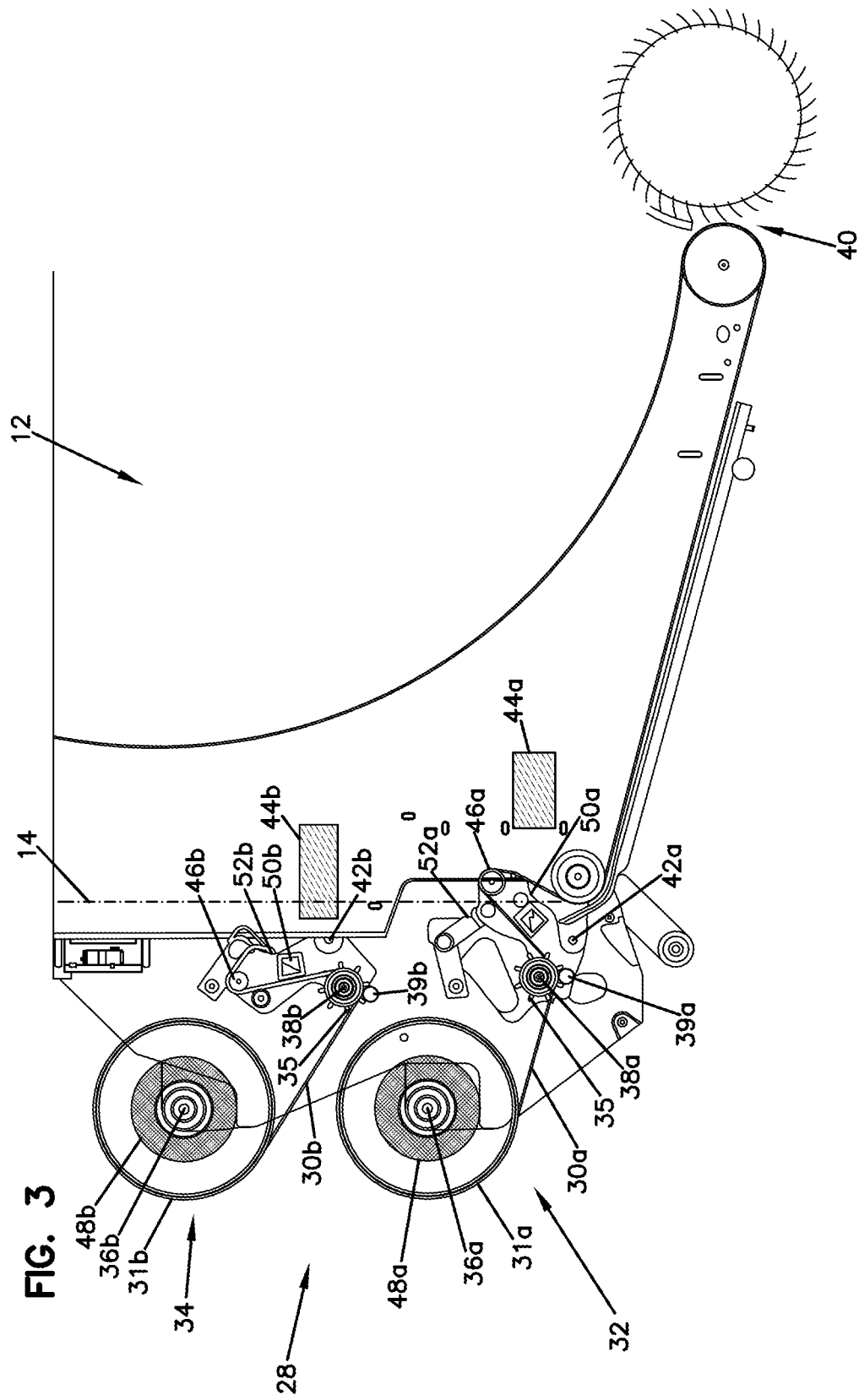
FIG. 3 is a schematic side view of a wrapping device in accordance with the principles of the present disclosure that can be used with balers such as the baler of FIGS. 1 and 2, the wrapping device includes dual feed and cutting mechanisms.
Figure 4:
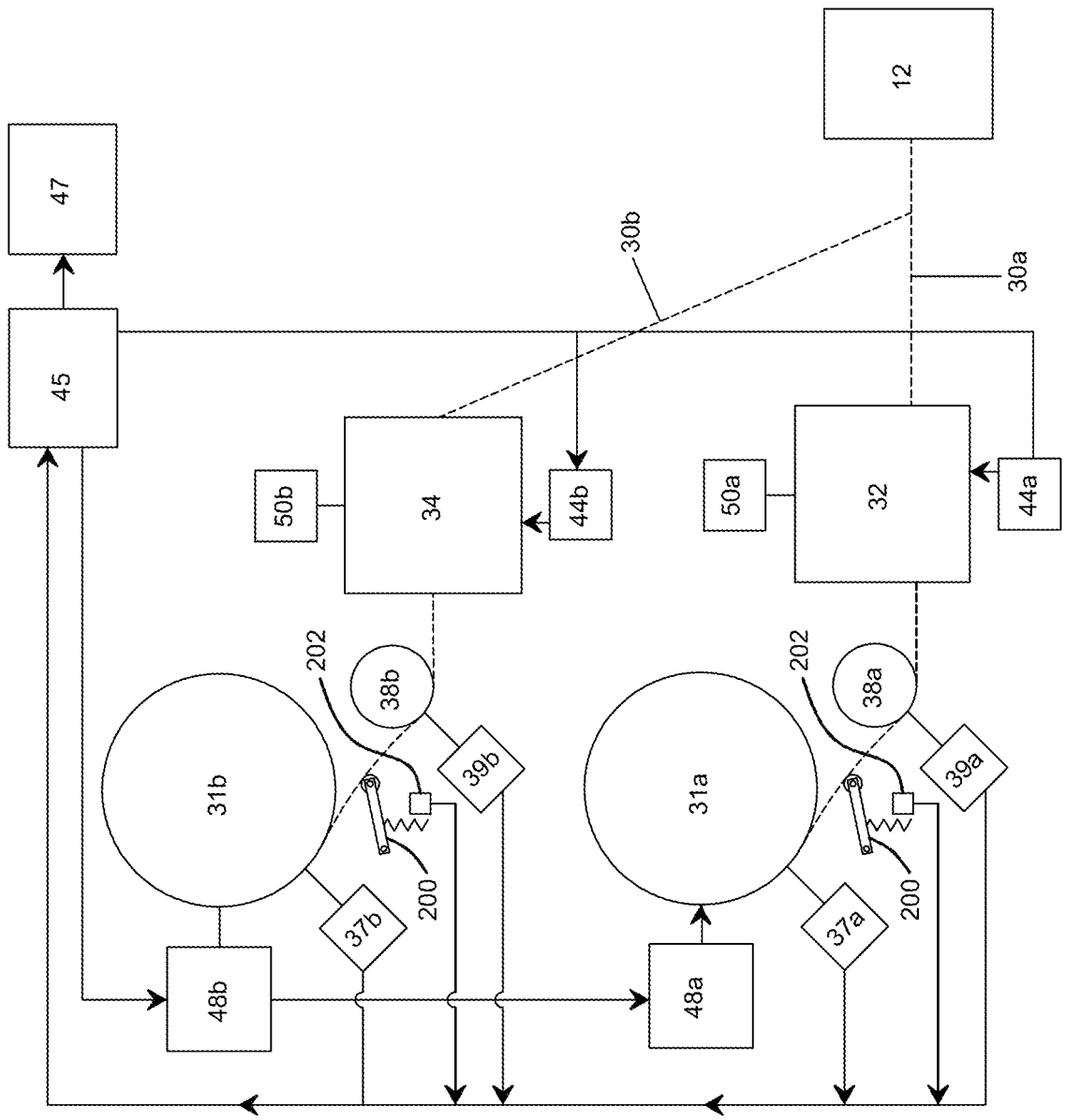
FIG. 4 is a block schematic representation of the components of the wrapping device of FIG. 3.

FIGS. 3 and 4 show schematics of the wrapping device 28 of FIGS. 1 and 2. The wrapping device 28 consists of a first roll wrapping mechanism 32 and a second roll wrapping mechanism 34. In the preferred embodiment, both mechanisms 32, 34 are identical. The first roll wrapping mechanism 32 is preferably positioned on the bottom, or nearest the ground, of the wrapping device 28, while the second roll wrapping mechanism 34 is preferably situated above the first roll wrapping mechanism 32 of the wrapping device 28. It is appreciated that the first and second roll wrapping mechanisms 32, 34 may be positioned in a side-by-side, or other position, with little modification.

The wrapping mechanisms 32, 34 respectively supply wrap material 30a, 30b to the baling chamber 12 by introducing the wrap material 30a, 30b to the bale forming belts 14, which then by way of friction, carry the wrap material 30a, 30b to an inlet 40, into the baling chamber 12 and around the fully formed bale 26. The wrapping mechanisms 32, 34 respectively include wrap material rolls 31a, 31b. The rolls 31a, 31b are removably mounted to a mounting assembly 36a, 36b for feeding the wrap material into the bale chamber. In the illustrated embodiment, the mounting assemblies 36a, 36b are spindles and the spindles 36a, 36b are mounted to the wrapping mechanisms 32, 34. In use, the rolls 31a, 31b can rotate with their respective spindles 36a, 36 about respective spindle axes as wrap material 30a, 30b is applied to a bale within the baling chamber 12. In other embodiments, the wrap material rolls 31a, 31b may, instead, rest in a cradle, upon a plurality of rollers or the mounting assembly may include a holding device such as two lateral shaft stubs.

The wrapping mechanisms 32, 34 further include spreader rollers 38a, 38b. The spreader rollers 38a, 38b spread out the wrapping material 30a, 30b before it is introduced into the baling chamber 12 to ensure uniform wrapping.

The wrapping mechanisms 32, 34 have three positions. The first position is a power-feed position (e.g., feed initiation position) where each wrapping mechanism 32, 34 uses a feed pan 46a, 46b to force the wrap material 30a, 30b against the moving bale forming belts 14 causing the belts to frictionally grip the wrap material and carry the wrap material toward the inlet 40. The second position is a feed position where the wrapping mechanism pulls the feed pan 46a, 46b away from the belts 14 while the belts 14 continue to carry the wrap material into the baling chamber 12. The third position is a cutting position where the wrapping mechanisms 32, 34 use shears 52a, 52b to press the wrap material 30a, 30b against knives 50a, 50b to sever the wrap material 30a, 30b.

In all three positions, the feed mechanism can apply a braking force to the wrap material 30a, 30b by way of brakes 48a, 48b (FIG. 4). The brakes 48a, 48b can apply a force to the wrap material rolls 31a, 31b to provide for controlled rotation of the rolls. In the preferred embodiment, the brakes 48a, 48b are electric brakes, but it is understood that a mechanical braking apparatus may be used to provide adequate tension to the wrapping material 30a, 30b.

Figure 15:
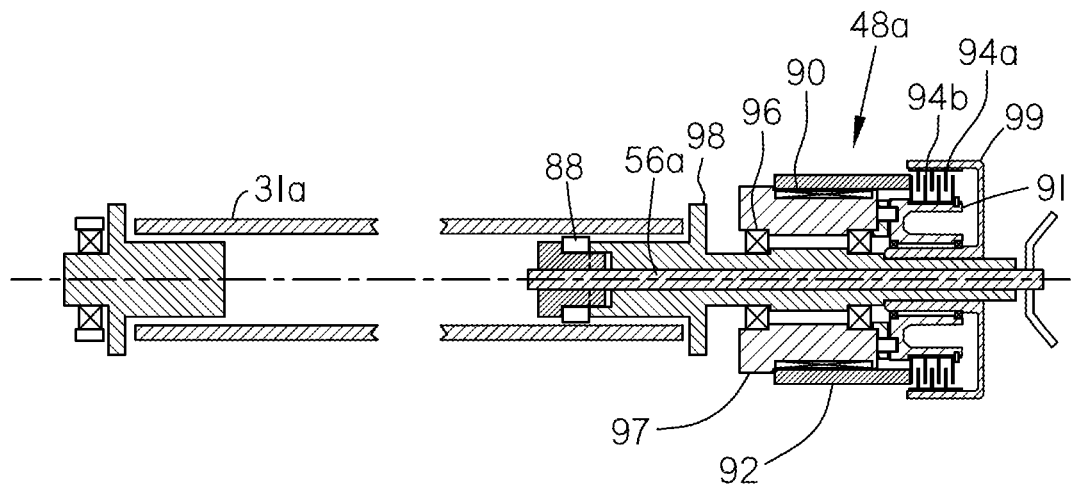
FIG. 15 is a top view of an electric brake of the round baler with a shaft stub that extends through the wrapping material roll.
Figure 16:
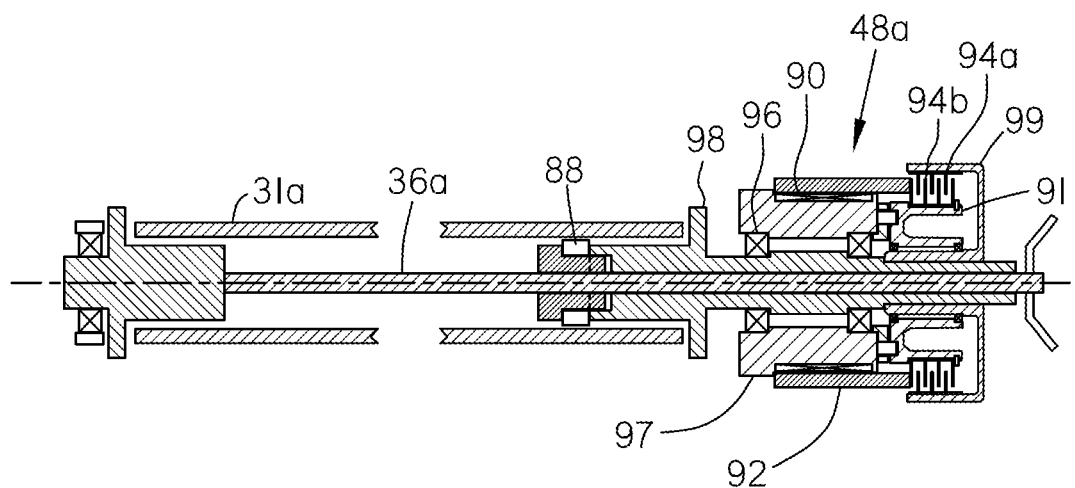
FIG. 16 is a top view of an electric brake of the round baler with a spindle that extends through the wrapping material roll.

An exemplary brake 48a that is electronically actuated is shown in FIGS. 15 and 16. The second brake 48b may be identical to the first electric brake 48a. The electric brake 48a is shown in FIG. 15, to illustrate the general engineering principle of one potential brake arrangement, with a shaft stub 56a for supporting the roll 31a and with a spindle 36a in FIG. 16. The roll 31a is shown in FIGS. 15 and 16 without wrapping material in its fully-depleted state. An expandable collet 88 fits within the roll 31a to grip the roll. The collet 88 is supported by a chuck 98 that rotates with the roll 31a when the collet 88 has been expanded. The chuck 98 rotates within bearings 96 that are mounted in a non-rotating support frame 97. A rotating portion of a brake assembly, outer brake hub 99 is operatively connected to chuck 98. The brake 48a further includes an inner brake hub 91 that is operatively connected to the non-rotating support frame 97. This configuration of a brake thus includes an outer brake hub 99 that rotates relative to an inner brake hub 91. This embodiment is illustrated with rotating brake pads 94a that are operatively attached to the outer brake hub 99, and non-rotating brake pads 94b attached to inner brake hub 91. When these brake pads are forced together with a brake actuating force they create friction, to resist the rotation of the netwrap roll. This embodiment is intended to be illustrative of the general principle, illustrating one potential method for generating a variable brake actuating force, with a plunger 92 and a coil 90. Upon activating the coil 90 by applying a current, the plunger 92 moves in the direction of the outer brake hub 99 applying a brake actuating force to the brake pads and with the resulting braking torque being proportional to the force.

An alternative embodiment of a device capable of generating a variable torque is described in U.S. Pat. No. 5,503,349, which is incorporated by reference for all relevant and consistent purposes, where the inner brake hub 91, outer brake hub 99, and brake pads 94a and 94b are replaced with a rotor-stator arrangement. Another alternative embodiment of a device capable of generating a variable torque is described in U.S. Pat. No. 7,908,822, which is incorporated by reference for all relevant and consistent purposes. Generally, any suitable braking system may be used unless stated otherwise herein.

An exemplary brake 48a that is electronically actuated is shown in FIGS. 15 and 16. The second brake 48b may be identical to the first electric brake 48a. The electric brake 48a is shown in FIG. 15 with a shaft stub 56a for supporting the roll 31a and with a spindle 36a in FIG. 16. The roll 31a is shown in FIGS. 15 and 16 without wrapping material in its fully-depleted state. An expandable collet 88 fits within the roll 31a to grip the roll. The collet 88 is supported by a hub 98 that rotates with the roll 31a. The hub 98 rotates within bearings 96. The brake 48a includes a coil 90, plunger 92 and friction disk 94. Upon activating the coil 90 by applying a current, the plunger 92 moves to the right of the Figures with the braking torque being proportional to the applied force.

To facilitate the movement of the wrapping mechanisms 32, 34 into all three positions, the wrapping mechanisms 32, 34 preferably have feed mechanism pivots 42a, 42b. In the preferred embodiment, actuators 44a, 44b are used to move the feed mechanisms 32, 34 between the three positions. In addition, it is preferred that that actuators 44a, 44b be in communication with a controller 45 (referred to herein also as a "control unit"). The controller 45 is preferably in communication with an interface 47 for displaying information regarding the wrapping system and the like to the operator of the round baler.

In the depicted example each wrapping mechanism 32, 34 includes a plurality of sensors (FIG. 4). Wrap material roll sensors 37a, 37b may be used to sense the rate of rotation of the rolls 31a, 31b. These sensors may provide feedback to a control unit which can then notify the operator of the status of the wrapping rolls 31a, 31b. Notifications can be in the form of a low roll notification, an active feed notification, a no feed notification or a variety of other notifications. The wrapping roll sensors 37a, 37b may be electronic sensors, proximity sensors, transducers, imaging sensors, or mechanical sensors, like a bobbin. It is understood and considered part of this invention that there are a variety of methods and types of sensors that may be used to sense both movement of the wrapping rolls and size of the wrapping rolls. In other embodiments, it is anticipated that other sensors, like ultrasonic sensors and weight sensors, can be utilized to sense other qualities of the wrapping material rolls.

In addition to the wrapping roll sensors 37a, 37b, spreader roller rotational sensors 39a, 39b are preferably located near the spreader rollers 38a, 38b. These sensors 39a, 39b sense the rotational speed of each spreader roller 38a, 38b which, in turn, can be used to calculate the linear speed at which the wrap material is traveling. Based on the rotational speed of the rolls 31a, 31b and the linear speed of the wrapping material, the diameter of the wrapping material rolls can be calculated by the controller. In other embodiments, the sensors 39a, 39b may sense movement representative of the speed of the spreader rollers 38a, 38b. The spreader roller sensors 39a, 39b may be imaging sensors, electronic sensors, like transducers, or mechanical sensors. In some embodiments the spreader roll sensors 39a, 39b only sense wrapping material being applied to the bale when the wrapping roll sensors 37a, 37b are sensing movement of the wrap material rolls (e.g., the sensors 37a, 37b may only sense movement if at least one of the rolls is rotating at a speed above a predetermined rate). This aspect can decrease false readings from instances, like bumps, that may cause the spreader roller(s) to rotate when no wrapping material is being applied to the baling chamber. It is understood and considered part of this invention that there are a variety of methods and types of sensors that may be used to sense the movement and speed of the spreader rollers 38a, 38b or any other rollers that the wrapping material passes over or past. This rotational speed may be provided as input into a controller 45. In another embodiment the speed of the driving means 18, or power takeoff, may be sensed and used to calculate the linear speed of the wrapping material. The power takeoff speed may be used to first calculate the speed of the bale forming belts. The linear speed of the wrapping material can then be equated to the linear speed of the bale forming belts, as the two speeds should be equal once the wrapping material has starting feeding along the bale forming belts.

FIG. 4 shows a block diagram of a round baler wrapping system. The diagram shows inputs provided to the controller 45 from the spreader roller sensors 39a, 39b and the wrapping roll sensors 37a, 37b. In certain embodiments the sensors 39a, 39b, 37a, 37b may be wired to the controller 45. In other embodiments the sensors may be wireless sensors. In addition, in the depicted embodiment the controller is in communication with an interface 47. The interface 47 may provide the operator information representative of the controller 45 and wrapping device 28. The controller 45 provides output signals to the actuators 44a, 44b, and the brakes 48a, 48b, respectively, to control the wrapping process. In other embodiments it is understood that output signals may be provided by the controller 45 to a variety of devices that control the operation and movement of the wrapping mechanisms 32, 34. Such devices could include electric motors, hydraulic cylinders, pneumatic cylinders or the like.

The control unit is preferably configured to vary the brake pressure applied by the brakes 48a, 48b on the wrapping material rolls 31a, 31b respectively in order to maintain substantially consistent tension in the applied wrapping material. In some embodiments the braking pressure may be applied directly to the wrapping material rolls 31a, 31b. In other embodiments the braking pressure may be applied to the spindles 36a, 36b. The control unit preferably varies the braking pressure based on a function of the diameter of the wrapping material rolls 31a, 31b. In some embodiments when the brakes are electric, the control unit may vary the amperage or voltage supplied to the brakes 48a, 48b to control the braking pressure. Preferably, as the size of the wrapping material roll decreases, the amount of braking pressure decreases. In other embodiments, the tension of the wrapping material may be measured by a variety of sensors and the brake pressure may be varied based on a predetermined preferred value for wrapping material tension.

In further embodiments, the control unit can monitor the wrapping material speed for sudden decreases. The control unit may identify a sudden decrease in speed by a certain percentage drop of the speed during a set time interval. A sudden decrease in speed correlates in a sudden increase in tension, which increases the likelihood that the wrapping material could break. In order to prevent breakage when a decrease in the linear speed of the wrap is detected, the control unit can lessen the braking pressure for a predetermined time and then reset the braking pressure to maintain adequate tensioning on the wrapping material. In other embodiments the braking pressure may be varied based on a function of the wrapping material roll diameter and the wrapping material tension. In further embodiments, the control unit may measure the speed of the wrapping material before any braking pressure is applied and compare it to the speed of the wrapping material after braking pressure has been applied. In such an embodiment, the control unit can use the comparison to create a percentage of wrapping material stretch that is being applied. The control unit may then adjust the braking pressure accordingly to achieve a desired stretch percentage.

In other embodiments the control unit may be in communication with a spring-loaded device (e.g., a spring biased pivoting arm 200), over which the wrapping material passes prior to entering the baling chamber. The spring loaded device may be configured in a variety of ways so that a component (e.g., an arm) deflects as tension is varied on the wrapping material. The control unit may be programed so that a predetermined amount of deflection of the spring-loaded component equates to ideal tension on the wrapping material. In one example, a sensor 202 can detect the amount of deflection of the spring-loaded component. The sensor 202 can be a separate sensor or can be integrated as part of the spring-loaded device. The control unity may then vary the braking pressure to achieve the desired deflection in the spring-loaded arm and thereby achieve the desired tension in the wrapping material. Additionally, after the wrap cycle has completed, the brake pressure can be removed from the wrapping material rolls 31a, 31b and the wrapping rolls can be allowed to freely rotate at the end of the wrapping cycle to allow the wrapping material to back spool slightly before the brake pressure is reapplied. This can improve the reliably of starting the wrapping material during the next wrapping cycle.

The control unit is preferably configured so that the operator is able to choose the size of a bale and the number of wraps of wrap material that is to be wrapped around the full bale. By knowing the diameter of the full bale and the desired total number of wraps of wrap material 30a, 30b, the control unit can calculate a total length of wrap material to be applied to the bale. Additionally, if the diameter of the spreader rollers and the sensed rate of rotation of the spreader roller sensors 39a, 39b are known, the control unit is configured to calculate the length of wrapping material being applied to the full bale based off the input provided by the sensors 39a, 39b.

In the preferred embodiment, the spreader roller sensors 39a, 39b are proximity sensors that sense when a flag 35, located on the end of the spreader rollers 38a, 38b, passes near the corresponding proximity sensor 39a, 39b. By counting the flags and measuring the time between flag detections, the rotational speed of the spreader roller can be determined. In the preferred embodiment, if the distance per flag 35 on the spreader rollers 38a, 38b is known then the control unit may calculate, based on feedback from the spreader roller sensors 39a, 39b and programed/input diameters of the spreader rollers 38a, 38b, the length of material being supplied to the full bale. For instance, if X number of wraps is desired for a bale of diameter Y, then the control unit will monitor the wrapping of the bale until Z number of pulses is seen by the spreader roller sensors 39a, 39b. Z pulses correspond to a length of wrap material equal to the circumference of the bale at diameter Y multiplied by number of wraps X. The calculation is completed by first determining the rotational speed (i.e. the angular velocity) of the spreader roller by measuring the time between flag detections. Second, the linear speed of the wrap material can be calculated by multiplying the angular velocity of the spreader roller by the radius of the spreader roller. Finally, the length of wrapping material dispensed from a single wrapping mechanism is calculated by multiplying the linear speed of the wrap material by the time the wrap material is dispensed. In other embodiments, complete rotations of the spreader roller may be measured and then multiplied by the circumference of the spreader roller to get the length of wrap material dispensed. In other embodiments the speed of the bale forming belts 14, measured by a proximity sensor, may be used instead of the speed of the spreader rollers to calculate the amount of wrapping material applied. In other embodiments the rotational speed of the bale 26 inside the baling chamber 12 may be used to calculate the amount of wrapping material applied.

Referring generally to the controller and methods of controlling, and referring to in particular computing systems embodying the methods and systems of the present disclosure, it is noted that various computing systems can be used to perform the control processes disclosed herein. For example, embodiments of the disclosure may be practiced in various types of electrical circuits comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, aspects of the methods described herein can be practiced within a general purpose computer or in any other circuits or systems.

Embodiments of the present disclosure can be implemented as a computer process (method), a computing system, or as an article of manufacture, such as a computer program product or computer readable media. The computer program product may be a computer storage media readable by a computer system and encoding a computer program of instructions for executing a computer process. Accordingly, embodiments of the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system.

While certain embodiments of the disclosure have been described, other embodiments may exist. Furthermore, although embodiments of the present disclosure relating to the controller have been described as being associated with data stored in memory and other storage mediums, data can also be stored on or read from other types of computer-readable media. Further, the disclosed methods' stages may be modified in any manner, including by reordering stages and/or inserting or deleting stages, without departing from the overall concept of the present disclosure.

In addition, in certain embodiments each wrapping mechanism 32, 34 may wrap a portion of, or all of, the number of wraps that is designated by the operator. In one embodiment, the lower wrapping mechanism 32 will provide 100% of the wrapping material to the full bale, which means the lower spreader roller sensor 39a will sense the total amount of pulses it takes to wrap a full bale. After such an amount is sensed, the control unit will cease wrapping. Alternatively, the upper wrapping mechanism 34 and spreader roller sensor 39b may behave in a similar way. In another embodiment, the operator may choose to operate both wrapping mechanisms 32, 34 at the same time. In such an embodiment, the lower and upper spreader roller sensors 39a, 39b will divide the total number of pulses needed for a user-defined full wrap and cease wrapping once each wrapping mechanism has wrapped the respective portion of the full wrap.

In certain embodiments, the controller may be programed to receive feedback from the spreader roller sensors 39a, 39b only if the wrapping roll sensors 37a, 37b are rotating at a speed faster than or equal to a predetermined RPM. Such a function in the control unit is valuable when a roll of wrapping material empties in the middle of a wrap cycle. In this situation the wrapping roll sensor may begin to slow to a stop while spreader roller's momentum may maintain its rotation for a short period of time after the wrapping material roll is empty and cause the spreader roller sensor to continue to count pulses as if wrap material is being applied to the bale. Because the wrapping roll sensor will lose momentum quickly, its speed will drop below a predetermined value, preferably 2.0 RPM, and the pulses from the spreader roller sensor 39a, 39b will no longer be counted towards the amount of wrap being applied to the bale. Additionally, by only receiving feedback from the spreader roller sensors when the wrapping material roll sensors are rotating above a predetermined RPM, it decreases the amount of false readings when the spreader rolls happen to move when the wrapping material is not feeding.

Figure 5:
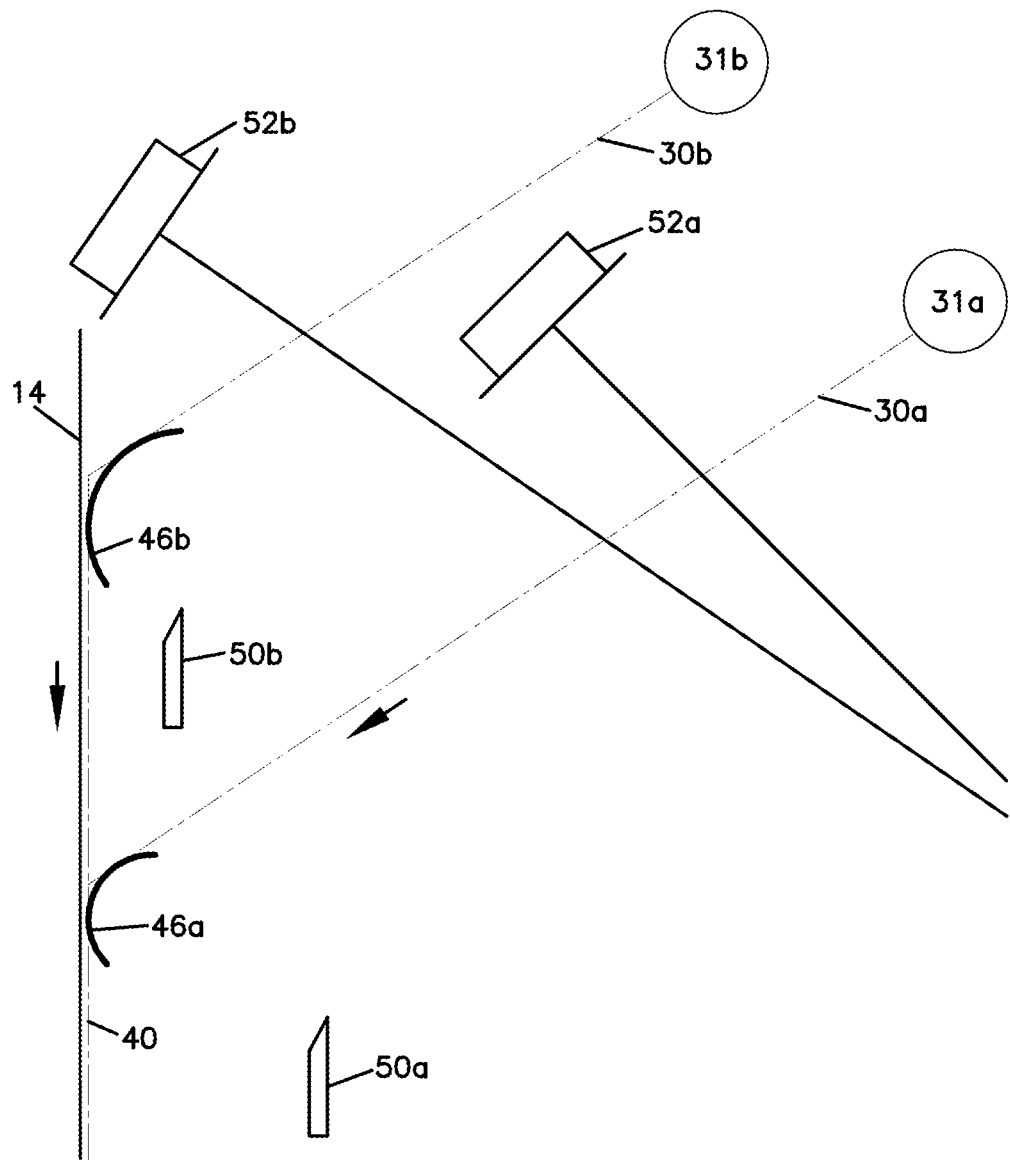
FIG. 5 is a schematic representation of the components of the wrapping device of FIG. 3 in a power feed position (i.e., feed initiation step)
Figure 6:
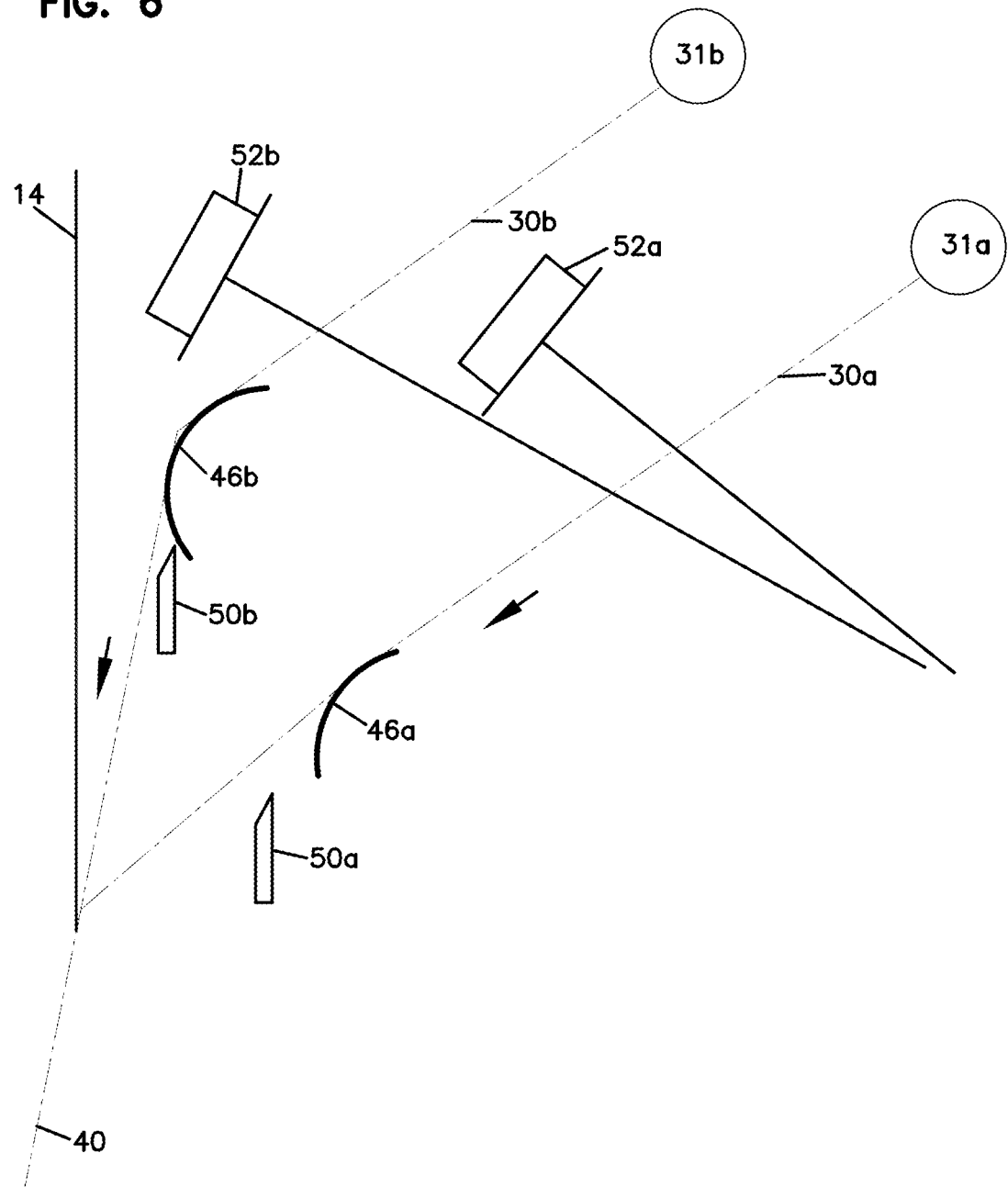
FIG. 6 is a schematic representation of the components of the wrapping device of FIG. 3 in a feed position.
Figure 7:
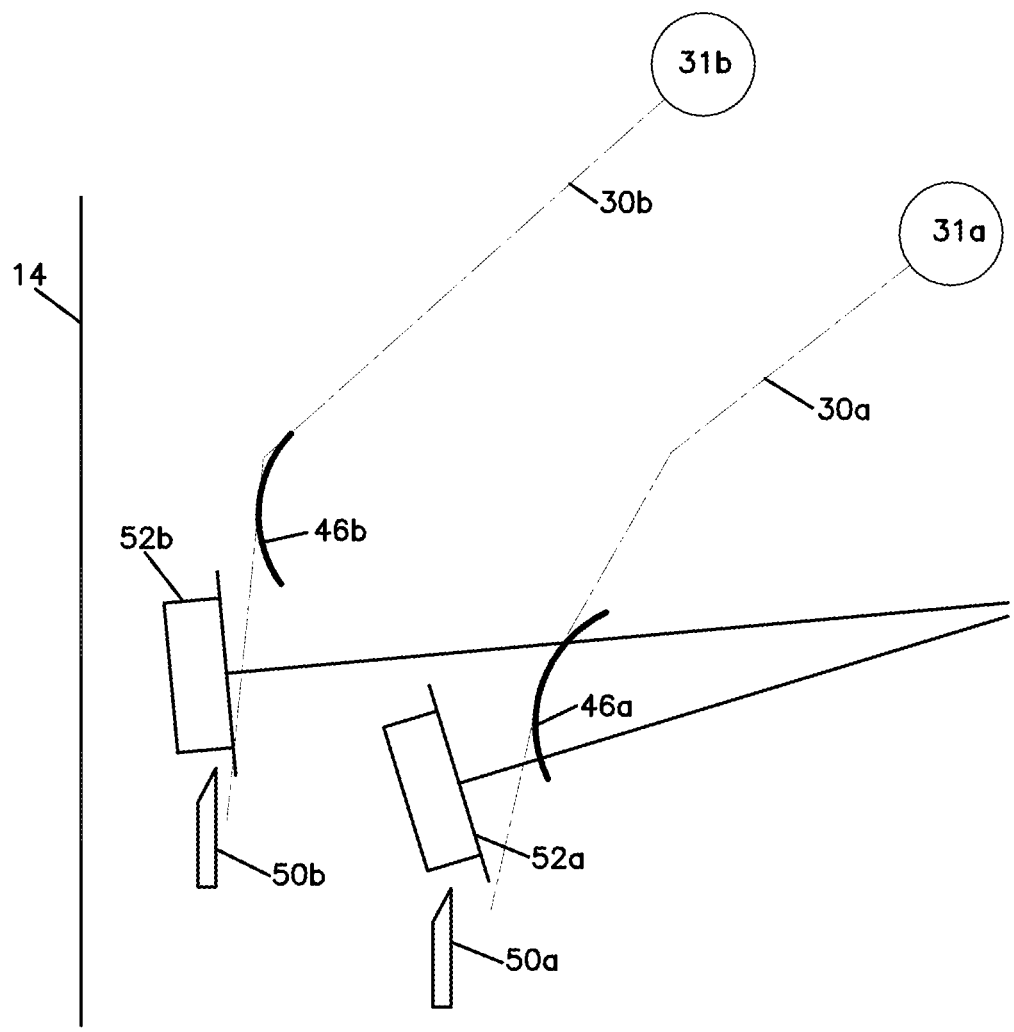
FIG. 7 is a schematic representation of the components of the wrapping device of FIG. 3 in a cut position.

FIGS. 5-7 show schematics of the example of FIG. 3. The schematics show two shears 52a, 52b, two feed pans 46a, 46b, two cutting devices 50a, 50b, and two feeds of wrap wrapping material 30a, 30b. In the preferred embodiment, each feed pan 46a, 46b may operate independently, thereby separately feeding wrap material 30a, 30b from each wrapping mechanism 32, 34 individually. Also, the feed pans 46a, 46b may also feed wrap material 30a, 30b from each wrapping mechanism 32, 34 concurrently. FIG. 5 shows both mechanisms power feeding, or applying the wrap material 30a, 30b to bale forming belts 14, concurrently but each feed pan 46a, 46b may also be fed individually. FIG. 6 shows both wrapping mechanisms 32, 34 in a feeding position so that wrap material from both feeds 30a, 30b is being fed into the baling chamber 12. Again, alternatively, both feeds 30a, 30b may be fed individually. Similarly, cutting each wrap material feed 30a, 30b may take place at separate times or concurrently. FIG. 7 shows both feeds 30a, 30b in the cutting position. To complete the cutting process the shears 52a, 52b press their respective wrap feed 30a, 30b against their respective knife 50a, 50b. In some embodiments the wrapping feeds 30a, 30b may be clamped to the feed pans 46a, 46b respectively before, concurrently, or after the cut is complete to ensure proper control of the wrapping material. There are multiple advantages to the example of FIGS. 3-7. Having two shears, two feed pans, and two cutting mechanisms provides the operator with complete control over how much, how fast, and what specific material is being applied the full bale 26. Additionally, it allows the operator to control when certain rolls of wrap material are applied to a bale.

In some embodiments, the wrap material used in the first wrapping mechanism includes a visual indication that is a different than a visual indication of the wrap material used in the second wrapping mechanism. For example, the wrap materials used in each respective wrapping mechanism may be different in color. Different colors of wrap material may be used to identify different bale characteristics (e.g., type of forage material, forage moisture and the like). A moisture sensor may be included on the baler and the type (e.g., color) of wrap material may be chosen by the controller based on the sensed moisture.

In certain examples, the control unit has a predetermined set of modes pre-programmed to control the wrapping mechanisms 32, 34 during bale wrapping. In each of the modes described herein, the wrap materials used in each respective wrapping mechanism may differ by the visual indication (e.g., color), breathability, weather resistance, stretch, width or thickness of the materials or, as in other embodiments, the wrapping materials may be substantially the same.

The first mode is a single roll mode where the control unit only operates a single wrapping mechanism 32, 34 during wrapping of a bale. In this mode of operation, the operator is able to select the first wrapping mechanism or the second wrapping mechanism for bale wrapping based on the type of wrap material in each mechanism and/or based on characteristics of the bale as described above.

In some embodiments involving the first mode, the single wrapping mechanism may be used until the first roll is fully or substantially depleted, at which time use of the other wrapping mechanism may be initiated. The degree of depletion of the first roll may be determined by suitable methods including measuring or calculating the diameter of the roll or by determining the length of wrap used (e.g., by use of a bale count and the diameter of wrapped bales as described above). The switch in operation from the first wrapping mechanism to the second wrapping mechanism may be initiated by the user or by the controller and may be initiated during wrapping of a bale or after a bale has been fully wrapped.

The second mode is a dual roll stepped mode where the control unit first feeds the first roll wrapping mechanism 32 until a predetermined amount of wrap material has been dispensed. In some examples the predetermined amount may be equal to a particular percentage of the overall length of wrap material 30a, 30b that is to be applied to the bale, which is defined by the operator. After the first roll wrapping mechanism 32 dispenses the predetermined amount of wrap material 30a, 30b it then stops and completes a cut. The control unit then begins to feed the second wrapping mechanism 34 and stops the feeding after a predetermined amount of wrap material 30a, 30b is dispensed and performs a cut.

The third mode is a dual roll staggered mode where the control unit starts the feeding of the first roll wrapping mechanism 32 until a predetermined amount of wrap material is dispensed. Without stopping the first wrapping mechanism 32, the control unit then starts feeding of the second wrapping mechanism 34 until a predetermined amount of wrap material is dispensed. The second wrapping mechanism 34 then completes a cut of the wrap material followed by the first wrapping mechanism 32 completing a cut of the wrap material.

The fourth mode is a dual roll simultaneous mode where the control unit begins the feeding of the first wrapping mechanism 32 and, after a predetermined amount of time passes or a predetermined length of wrap material has been fed, the control unit begins feeding the second wrapping mechanism 34. Alternatively, both the first and second wrapping mechanisms 32, 34 may be fed simultaneously. Once the desired length of wrapping material has been applied to the bale, both wrapping mechanisms 32, 34 perform a cut. Also, the fourth mode is configured to cease the attempted feeding of a wrapping mechanism 32, 34 if the spreader sensors 39a, 39b sense that a predetermined amount of wrap material has been fed by one wrapping mechanism while the other wrapping mechanism fails to feed (e.g., if one wrapping mechanism has applied 50% or more of the total wrap to be applied, the second wrapping mechanism will not initiate).

Figure 14:
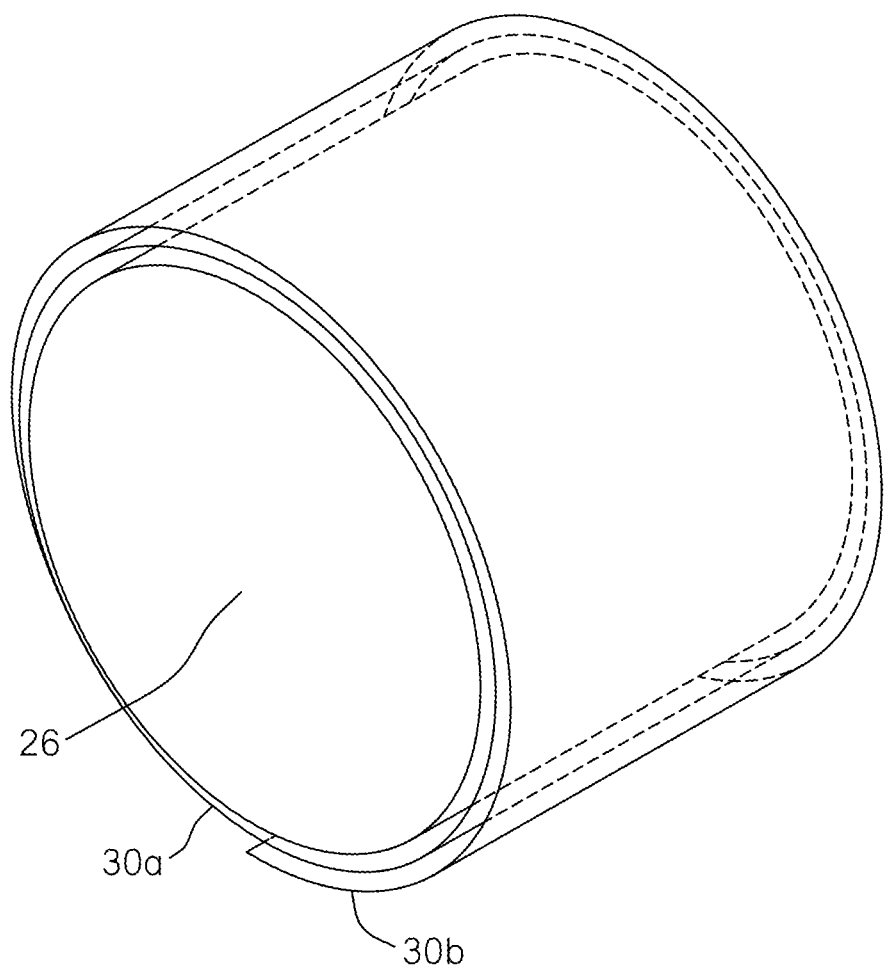
FIG. 14 is a perspective view of a wrapped bale having a breathable wrap fully encompassing the circumference of the bale and having a weatherproof wrap partially encompassing the circumference of the bale.

In some modes of operation (e.g., the third or fourth modes), a weatherproof material may be partially wrapped around the bale. One wrapping mechanism 32, 34 may be used to initiate wrapping the bale with a standard netwrap material around the bale and the other wrapping mechanism may be used to wrap the bale with a weatherproof material. For example, the roll 31b may include netwrap material and roll 31a may include weatherproof material. The wrapping mechanism 34 may be initiated to warp the bale with the netwrap material. The other wrapping mechanism 32 is then initiated to feed the weatherproof material simultaneous with the netwrap material 30b. Upon wrapping the bale partially with the weatherproof material 30a (e.g., a half (½) to three-quarter (¾) of the bale circumference), the weatherproof material is cut. The wrapping mechanism 34 continues to feed the second roll 31b (e.g., for a revolution of the bale) and the netwrap material 30b is cut. Referring now to FIG. 14, the resulting wrapped bale includes netwrap material 30b that fully wraps the bale and a weatherproof material 30a that partially encompasses the bale circumference. The weatherproof material is disposed between the inner layer and outer layer of breathable wrap material. Preferably, the bale is unloaded with the weatherproof material being at the top portion of the bale and the "open" portion (i.e., portion without weatherproof material) being in contact with the ground. Alternatively, the bale may be rotated such that the portion of the bale without weatherproofing material contacts the ground during storage of the bale.

Figure 8:
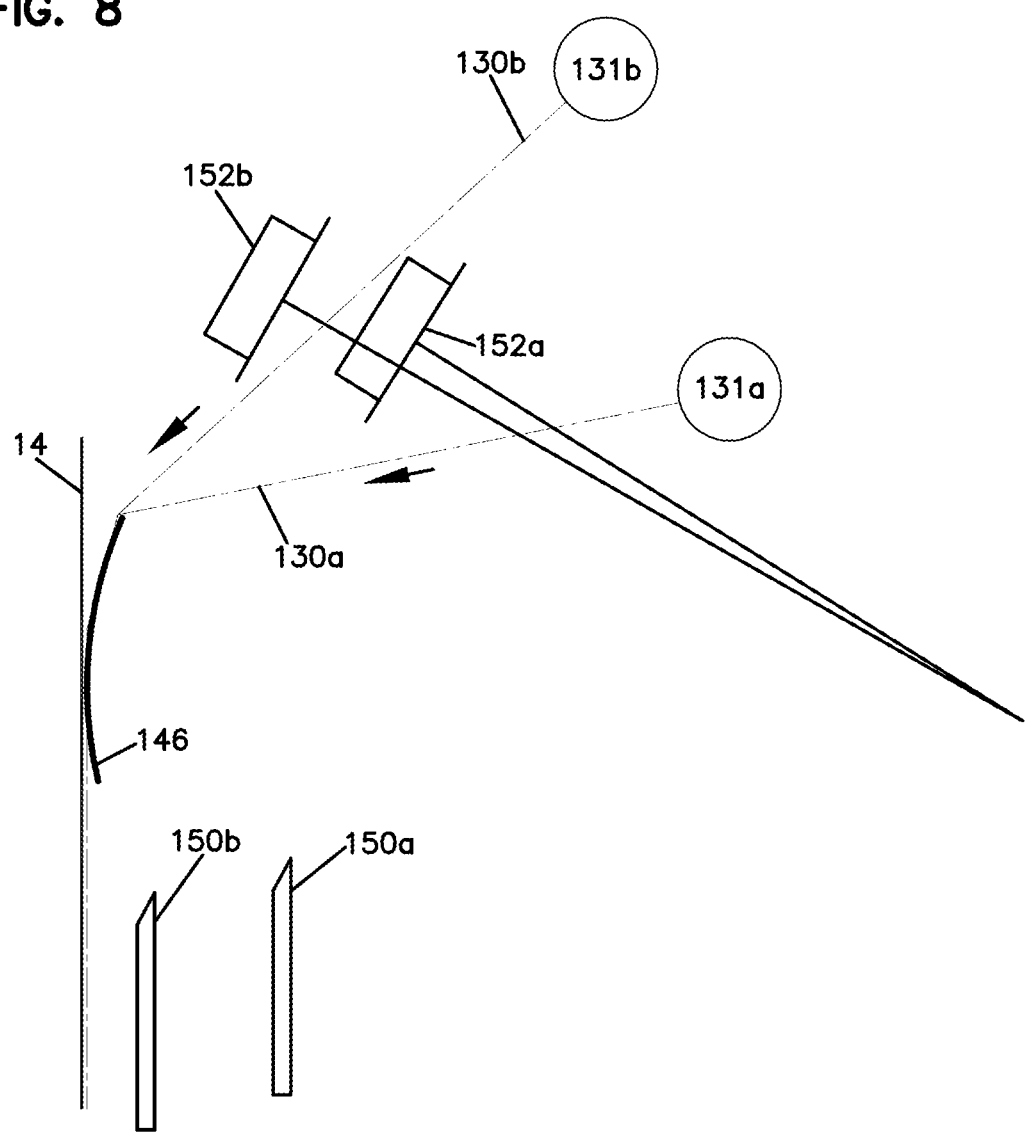
FIG. 8 is a schematic representation of the components of an alternative wrapping device in accordance with the principles of the present disclosure with a single feed mechanism in a power feed position, the wrapping device includes a single feed mechanism and dual cutting mechanisms.
Figure 9:
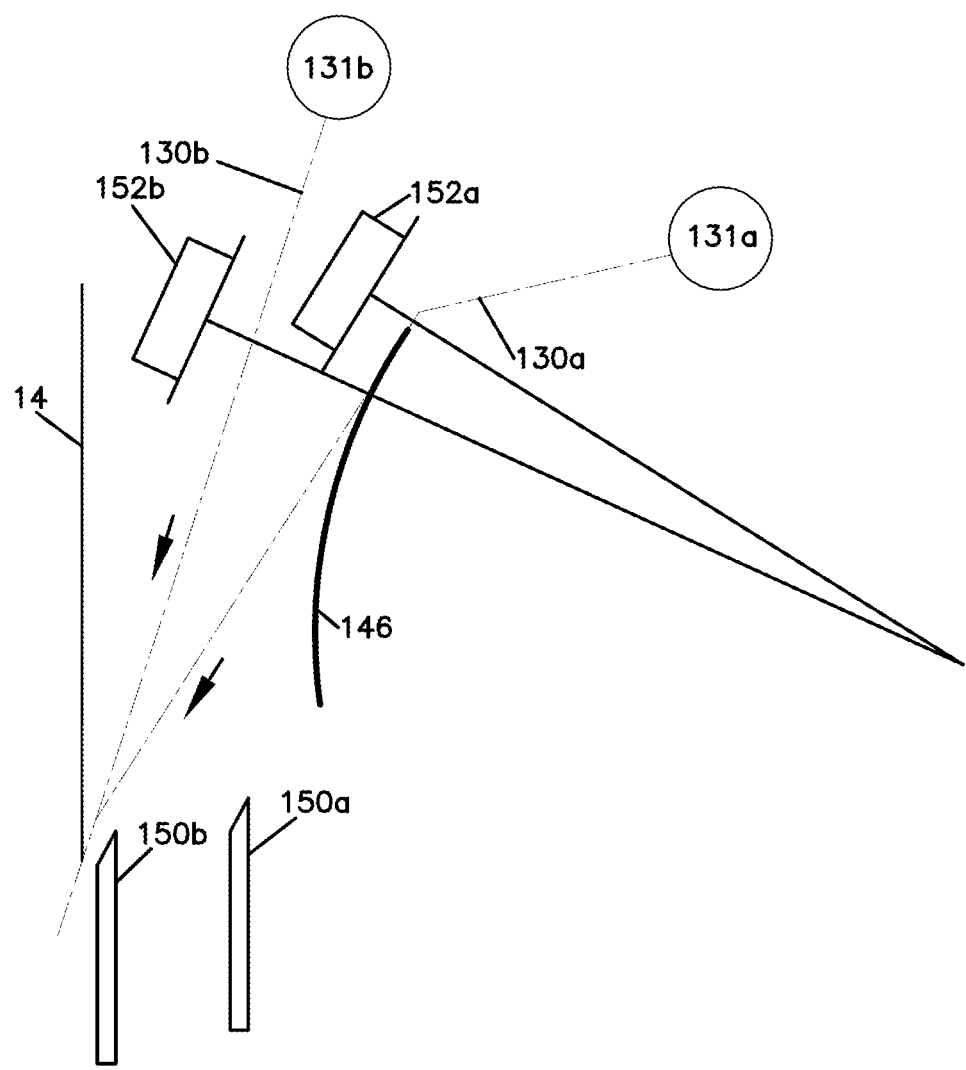
FIG. 9 is a schematic representation of the components of the wrapping device of FIG. 8 in a feed position.
Figure 10:
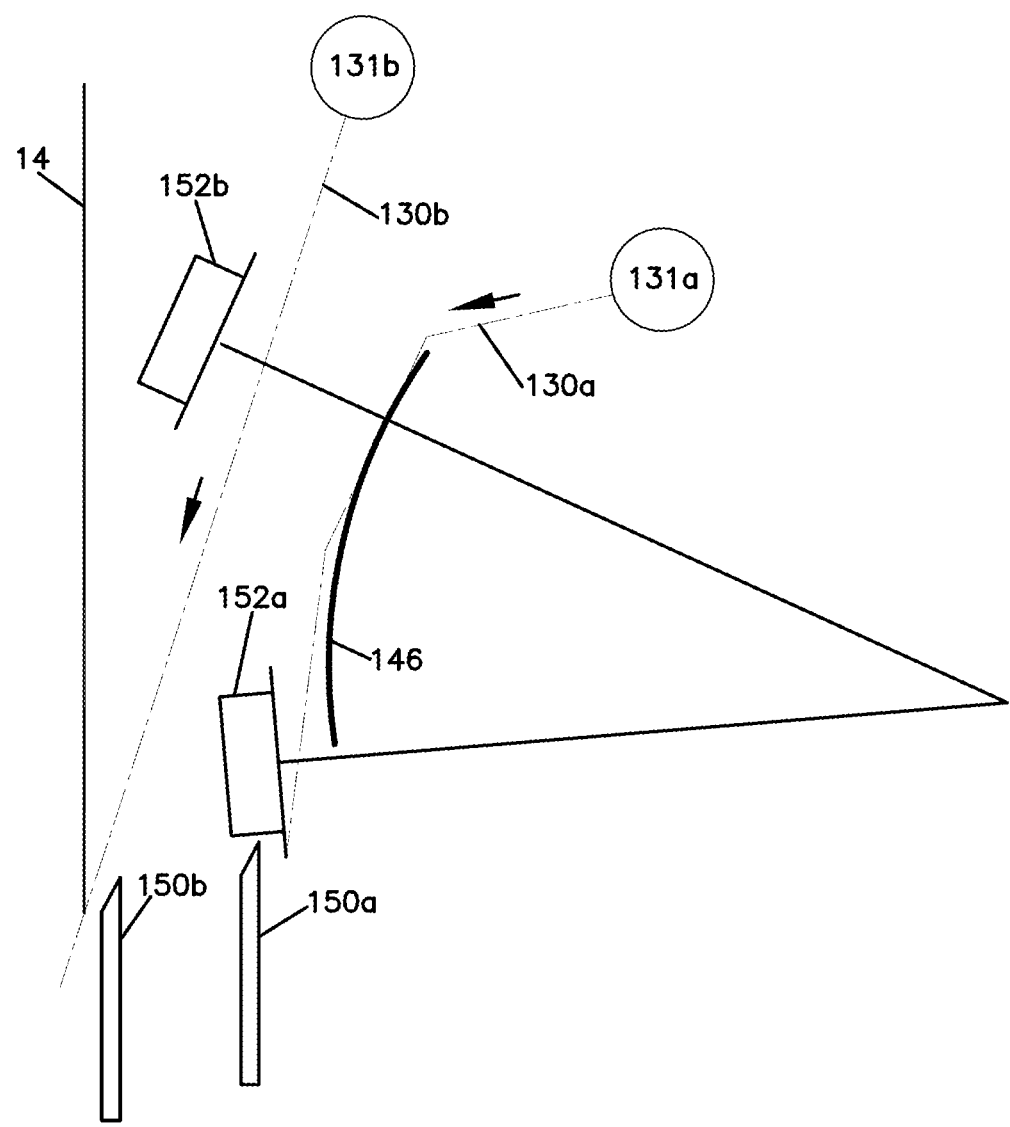
FIG. 10 is a schematic representation of the components of the wrapping device of FIG. 8 in a cut position.

FIGS. 8-10 show schematics of an alternative embodiment. The schematics show two feeds of wrap wrapping material 130a, 130b, two shears 152a, 152b, two cutting devices 150a, 150, and a single feed pan 146. As shown in FIGS. 8 and 9, it is only possible to feed both feeds of wrapping material 130a, 130b from the wrap material rolls 131a, 131b at the same time and not individually due to the existence of a single feed pan 146. However, as shown in FIGS. 9 and 10, cutting may be performed at separate times, with the caveat that the lower feed 130a should be cut first or at the same time and the upper feed 130b. This is due to the fact that the lower feed 130a runs past the knife 150b of the upper feed 130b.

Figure 11:
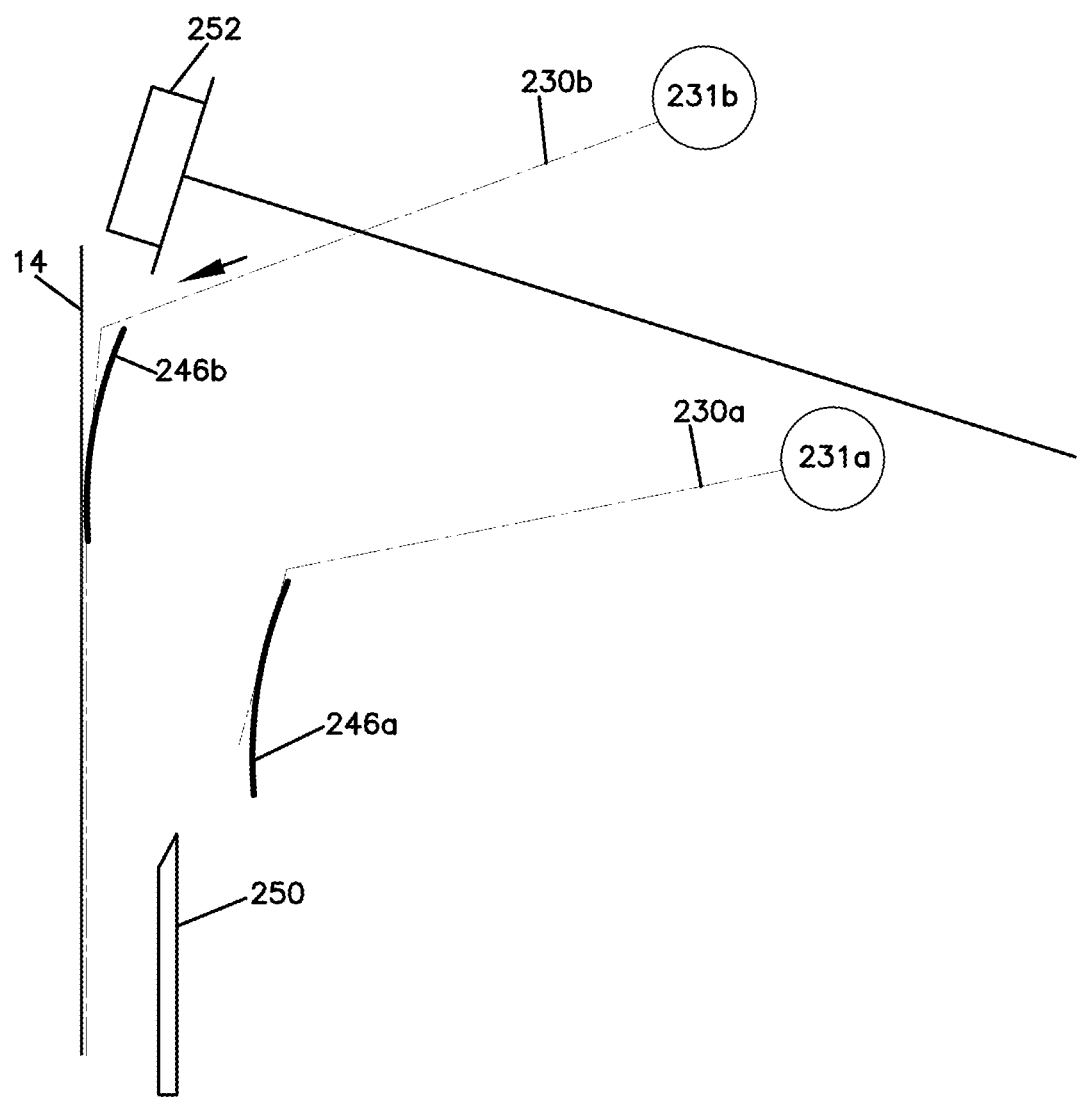
FIG. 11 is a schematic representation of the components of another alternative wrapping device in accordance with the principles of the present disclosure with a single cut mechanism in a power feed position, the wrapping device includes a dual feed mechanism and a single cut mechanism.
Figure 12:
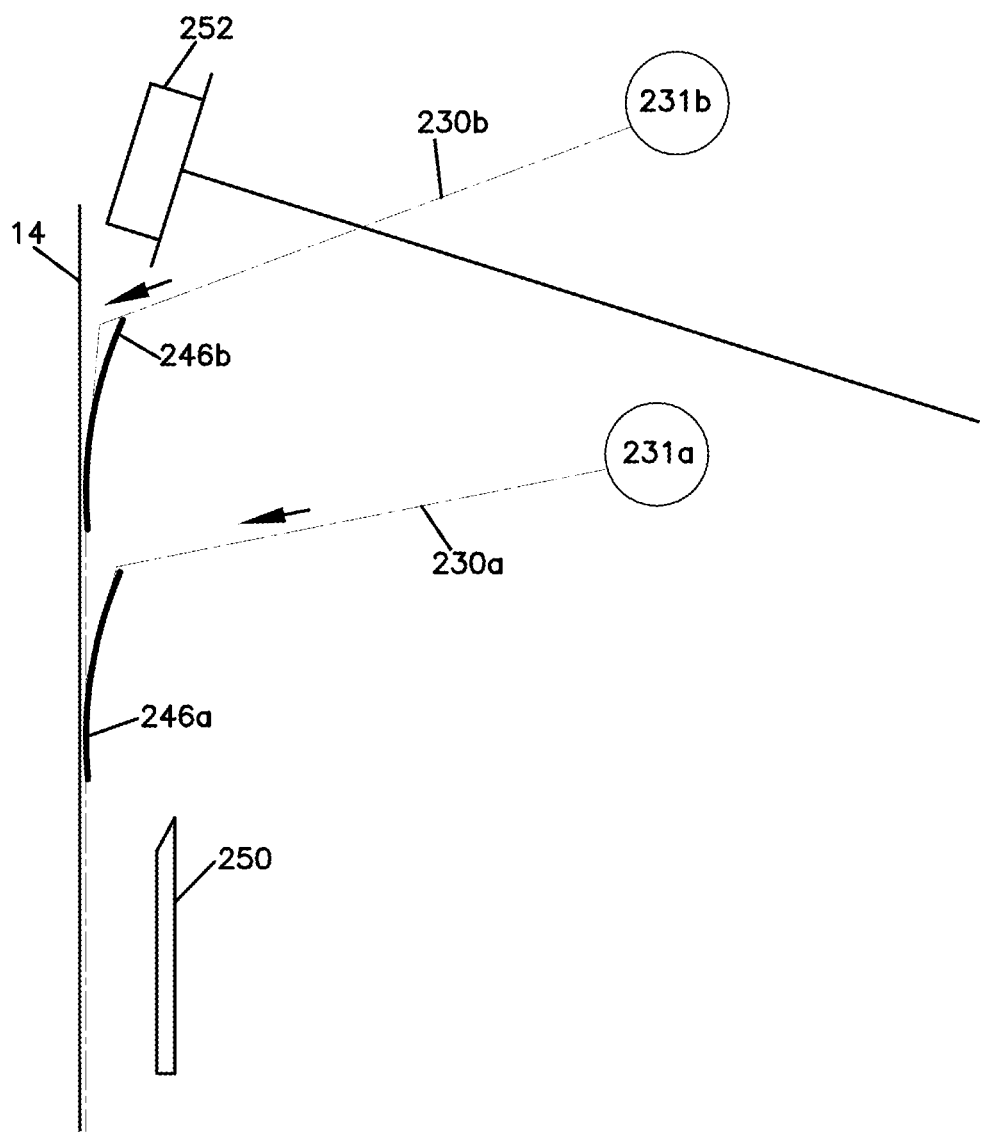
FIG. 12 is a schematic representation of the components of the wrapping device of FIG. 11 in an alternative power feed position.
Figure 13:
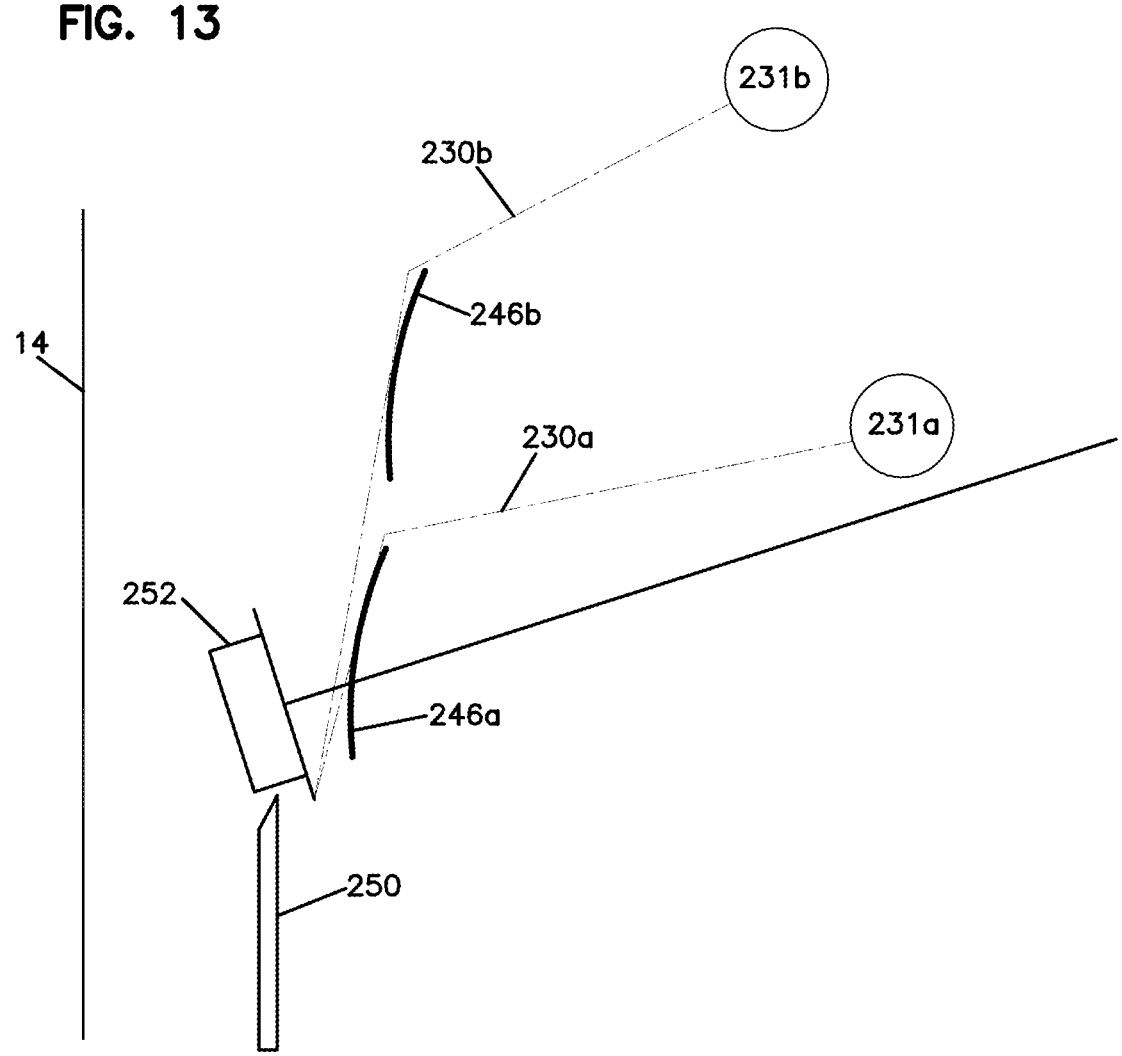
FIG. 13 is a schematic representation of the components of the wrapping device of FIG. 11 in a cut position.

FIGS. 11-13 show schematics of an additional alternative embodiment. The schematics show two feeds of wrapping material 230a, 230b, a single shear 252, a single cutting device 250, and two feed pans 246a, 246b. Due to the existence of dual feed pans 246a, 246b, the separate feeds 230a, 230b, from wrap material rolls 231a, 231b respectively, may be started individually with the caveat that the upper feed 230b should be started before the lower feed 230a. This is due to the existence of a single cutting device 250. Because both feeds are cut at the same location at 250, the severed part of the upper feed 230b will be hanging near the lower feed pan 246a, therefore causing the upper feed 230b to feed when the lower feed pan 246a is put into a power-feed position. FIG. 11 shows the upper feed pan 246b starting the upper feed 230b first. FIG. 12 shows both feeds 230a, 230b starting concurrently. FIG. 13 shows both feeds 230a, 230b being cut simultaneously.

The above specification, examples and data provide a complete description of the manufacture and use of the composition of the invention. In addition, various aspects of preceding disclosure are applicable to both fixed chamber round balers and variable chamber round balers. Since many embodiments of the invention can be made without departing from the spirit and scope of the invention, the invention resides in the claims hereinafter appended As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A round baler comprising:
   a baling chamber for forming a bale;
   a first wrapping mechanism mounted to the baling chamber, the first wrapping mechanism including a mounting assembly for removably mounting a roll of wrap material and for feeding the wrap material into the bale chamber;
   a first actuator attached to the first wrapping mechanism having three positions, a first position wherein the actuator moves the wrap material into a starting feed position, a second position wherein the wrap material is positioned in a feeding position, a third position wherein the actuator moves the wrap material into a cutting position wherein the wrap material contacts a cutting device;
   a second wrapping mechanism mounted to the baling chamber, the second wrapping mechanism including a mounting assembly for removably mounting a roll of wrap material and for feeding the wrap material into the bale chamber;
   a second actuator attached to the second wrapping mechanism having three positions, a first position wherein the actuator moves the wrap material into a starting feed position, a second position wherein the wrap material is positioned in a feeding position, a third position wherein the actuator moves the wrap material into a cutting position wherein the wrap material contacts a cutting device;
   an inlet wherein wrap material from the first wrapping mechanism and wrap material from the second wrapping mechanism enter the baling chamber; and
   a controller for controlling a wrapping cycle, wherein the controller is adapted to control the first wrapping mechanism and the second wrapping mechanism so that feeding from both wrapping mechanisms may be sequenced, wherein the controller has a first mode that only operates the feeding and wrapping of one wrapping mechanism during the wrapping cycle, a second mode that operates the feeding and wrapping of the two wrapping mechanisms at separate times during the wrapping cycle, a third mode that operates the feeding of the two wrapping mechanisms separately but the wrapping of the two wrapping mechanisms concurrently during the wrapping cycle, a fourth mode that operates the feeding and wrapping of the two wrapping mechanisms concurrently during the wrapping cycle.

2. The round bale of claim 1, wherein the inlet is a single inlet in which the wrap material of the first wrapping mechanism and the wrap material of the second wrapping mechanism enter the baling chamber.

3. The round bale of claim 1, wherein the first wrapping mechanism comprises a first cutting device for cutting the wrap material of the first wrapping mechanism and the second wrapping mechanism comprises a second cutting device for cutting the wrap material of the second wrapping mechanism.

4. The round baler of claim 3, wherein the first cutting device is a knife and the second cutting device is a knife.

5. The round baler of claim 1, wherein the first wrapping mechanism comprises a brake for applying force to the roll of wrap material of the first wrapping mechanism to provide for controlled rotation of the roll and the second wrapping mechanism comprises a brake for applying force to the roll of wrap material of the second wrapping mechanism to provide for controlled rotation of the roll.

6. The round baler of claim 1, further comprising a first sensor in communication with the controller, the first sensor being configured to measure a value representative of the amount of wrap material dispensed from the first wrapping mechanism and a second sensor in communication with the controller, the second sensor being configured to measure a value representative of the amount of wrap material dispensed from the second wrapping mechanism.

7. The round baler of claim 1, further comprising first and second rotational sensors in communication with the controller, the first rotational sensor being configured to sense the rotation of the roll of first wrap material and the second rotational sensor being configured to sense the rotation of the roll of second wrap material.

8. The round baler of claim 1, wherein the baling chamber includes a plurality of baling forming belts rotatably disposed therein, and wherein the first wrapping mechanism is adapted to apply wrap material of the first wrapping mechanism to a first location on the bale forming belts and the second wrapping mechanism is adapted to apply wrap material of the second wrapping mechanism to a second location on the bale forming belts.

9. A round baler comprising:
   a baling chamber for forming a bale;
   a first wrapping mechanism mounted to the baling chamber, the first wrapping mechanism including a mounting assembly for removably mounting a roll of wrap material and for feeding the wrap material into the bale chamber;
   a first actuator attached to the first wrapping mechanism having three positions, a first position wherein the actuator moves the wrap material into a starting feed position, a second position wherein the wrap material is positioned in a feeding position, a third position wherein the actuator moves the wrap material into a cutting position wherein the wrap material contacts a cutting device;
   a second wrapping mechanism mounted to the baling chamber, the second wrapping mechanism including a mounting assembly for removably mounting a roll of wrap material and for feeding the wrap material into the bale chamber;
   a second actuator attached to the second wrapping mechanism having three positions, a first position wherein the actuator moves the wrap material into a starting feed position, a second position wherein the wrap material is positioned in a feeding position, a third position wherein the actuator moves the wrap material into a cutting position wherein the wrap material contacts a cutting device;

an inlet wherein wrap material from the first wrapping mechanism and wrap material from the second wrapping mechanism enter the baling chamber;

a controller for controlling a wrapping cycle, wherein the controller is adapted to control the first wrapping mechanism and the second wrapping mechanism so that feeding from both wrapping mechanisms may be sequenced;

first and second rotational sensors in communication with the controller, the first rotational sensor being configured to sense the rotation of a first roll of wrap material and the second rotational sensor being configured to sense the rotation of a second roll of wrap material;

wherein the first wrapping mechanism includes a first spreader roller for spreading out the wrap material from a first roll of wrap material before the wrap material reaches the inlet and the second wrapping mechanism includes a second spreader roller for spreading out the wrap material from a second roll of wrap material before the wrap material reaches the inlet, wherein the first rotational sensor is positioned to measure the rotational speed of the first spreader roller and the second rotational sensor is positioned to measure the rotational speed of the second spreader roller.

10. The round baler of claim 9, wherein the controller is configured to not consider the speed of the first spreader roller measured by the first rotational sensor and the speed of the second spreader roller measured by the second rotational sensor unless the measured speeds of the first and second rotational sensors are greater than a predetermined speed.

11. The round bale of claim 9, wherein the inlet is a single inlet in which the wrap material of the first wrapping mechanism and the wrap material of the second wrapping mechanism enter the baling chamber.

12. The round bale of claim 9, further comprising:
a first cutting device for cutting the wrap material of the first wrapping mechanism; and
a second cutting device for cutting the wrap material of the second wrapping mechanism.

13. The round baler of claim 12, wherein the first cutting device is a knife and the second cutting device is a knife.

14. The round baler of claim 9, further comprising:
a first brake for applying force to the roll of wrap material of the first wrapping mechanism to provide for controlled rotation of the roll; and
a second brake for applying force to the roll of wrap material of the second wrapping mechanism to provide for controlled rotation of the roll.

15. The round baler of claim 9, further comprising a first sensor in communication with the controller, the first sensor being configured to measure a value representative of the amount of wrap material dispensed from the first wrapping mechanism and a second sensor in communication with the controller, the second sensor being configured to measure a value representative of the amount of wrap material dispensed from the second wrapping mechanism.

16. The round baler of claim 9, wherein the baling chamber includes a plurality of baling forming belts rotatably disposed therein, and wherein the first wrapping mechanism is adapted to apply wrap material of the first wrapping mechanism to a first location on the bale forming belts and the second wrapping mechanism is adapted to apply wrap material of the second wrapping mechanism to a second location on the bale forming belts.

* * * * *